United States Patent [19]

Garolfi

[11] Patent Number: 5,311,411
[45] Date of Patent: May 10, 1994

[54] FOG LIGHTING SYSTEM FOR A MOTOR VEHICLE

[76] Inventor: Gianni Garolfi, via Settevenepalo Km.6,400, 00069 Trevignano (Roma), Italy

[21] Appl. No.: 59,332

[22] Filed: May 11, 1993

Related U.S. Application Data

[63] Continuation-in-part of Ser. No. 827,027, Jan. 27, 1992, Pat. No. 5,215,369.

Foreign Application Priority Data

Jun. 13, 1991 [IT] Italy .................. RM.91-U/000125

[51] Int. Cl.⁵ .............................................. B60Q 1/00
[52] U.S. Cl. ......................................... 362/80; 362/65; 362/248; 362/359; 362/272
[58] Field of Search ............... 362/61, 80, 83.3, 234, 362/248, 359, 65, 272

[56] References Cited

U.S. PATENT DOCUMENTS

| | | | |
|---|---|---|---|
| 1,328,692 | 1/1920 | Richard | 362/83 |
| 1,596,473 | 8/1926 | Whittier | 362/61 X |
| 1,991,866 | 2/1935 | Rich | 362/80 |
| 2,221,054 | 11/1940 | Luker | 362/80 |
| 2,744,998 | 5/1956 | Halvorson | 362/80 |
| 4,928,216 | 5/1990 | Carr | 362/800 X |

FOREIGN PATENT DOCUMENTS

| | | |
|---|---|---|
| 515735 | 1/1931 | Fed. Rep. of Germany . |
| 995205 | 11/1951 | France . |
| 1143826 | 10/1957 | France . |

Primary Examiner—Stephen F. Husar
Attorney, Agent, or Firm—Beveridge, DeGrandi, Weilacher & Young

[57] ABSTRACT

A front section of a motor vehicle includes a fog light system with indirect lighting. The indirect lighting improves an operator's vision in fog and is obtained by projecting the beams of light of the front fog lights so that they are oriented in such a way as to leave a zone or corridor not directly lit immediately ahead of the motor vehicle. A projection of light beams solely outwardly or upwardly at an angle of 45, 60 or 90 degrees with respect to an axis extending in the direction of travel and through the projecting fog light is preferred. The fog light can be positioned such that the body or roof portion of a vehicle itself acts to prevent any inwardly directing light. A rectangular shield mounted on the vehicle roof with the lower portion axially extending further than the upper portion can be relied upon to block downwardly directed light. Tubular or rectangular shields positioned on the roof act together with the roof portion forward of the fog light or lights to prevent downwardly directing beams of light while allowing for upwardly projected beams at angles which range up to 45, 60 or 90 degrees. The beam of light originates at an axis which is parallel with the longitudinal axis of the vehicle and intersects the projecting fog light. The fog light can be mounted on the roof so as to be rotatable from a closed, flush position to a pop up position.

23 Claims, 5 Drawing Sheets

FOG LIGHTING SYSTEM FOR A MOTOR VEHICLE

This application is a continuation-in-part of U.S. patent application Ser. No. 07/827,027 filed Jan. 27, 1992, now U.S. Pat. No. 5,215,369, which is incorporated herein by reference.

BACKGROUND DISCUSSION

This invention relates to a fog lighting system for a vehicle. More particularly, this invention concerns a fog lighting system with indirect lighting, wherein the beams projected by the specially provided lamps or fog lights are so oriented as to supply a better visibility through the fog.

The fog lights usually employed in motor vehicles, as is well known, are, normally, a couple of white or colored low beam headlights, and they aim exclusively at penetrating or piercing the mist which, being between the motor vehicle driver and the route, limits the visibility and hides possible obstacles from the driver's view.

Such fog lights differ from one another by the color or the type of lamp employed, but they all have the common feature of directing the light beam before the vehicle towards the route thereof, thus giving rise to an opalescent wall made of the illuminated fog in front of the driver.

As fog is made of tiny droplets of water suspended in the air, when a direct light beam, e.g., from the headlights of a motor vehicle, impinges on them, said droplets reflect the light, thus giving rise to an illuminated barrier in front of the driver, which barrier is transverse to the route of the motor vehicle. Such barrier prevents the driver from viewing beyond it in order to ascertain the presence of any obstacle on the road.

As a consequence, the attempt at lighting the route directly ahead of the vehicle makes less visible, in the presence of fog, the obstacles immediately close to the motor vehicle itself.

SUMMARY OF THE INVENTION

Accordingly, an object of the present invention is to provide a fog light system that overcomes the drawback mentioned above, thus making the ride of vehicles under atmospheric conditions of reduced visibility safer.

According to the invention, the effect of reflection created by the lit fog is exploited instead of trying to penetrate the fog by directly lighting it. Such result is obtained, in one embodiment, by operating in such a way that the reflecting barrier is located on the sides of the road instead of being transverse to the road itself.

If the light projected by the fog lights, instead of being oriented ahead and centrally with respect to the motor vehicle is oriented ahead but diagonally outward towards the outside of the motor vehicle, thus leaving a front central zone not directly struck by the light, said central zone is indirectly lit by the fog which is directly struck by the fog lights' beams. The lit fog thus forms a kind of lit corridor on both sides of said central zone.

Accordingly, one embodiment of the present invention specifically provides a front section of a motor vehicle comprising two groups of headlights, each comprising at least a fog light, characterized in that two of said fog lights are located close to the body sides of the motor vehicle or right within said body sides, and in that the beams projected by each one of said two fog lights form, on a plane parallel to the ground and passing through the respective light sources, angles comprised between 0 and 90 degrees with the direction of the longitudinal axis of the motor vehicle, open towards the outside with respect to such central axis.

Preferably, said beams form angles between 0 and 60 degrees with the direction of said axis, in order to comply, e.g., with the Italian rules of the road, according to which the maximum angle of the fog lights, beams toward the outside with respect to the longitudinal axis of the motor vehicle is 60 degrees.

The position of the fog lights close to the body sides of the motor vehicle or right on the body sides themselves is to be understood as comprising all arrangements wherein said fog lights are sufficiently spaced from the central axis of the motor vehicle as to allow, possibly with the help of shielding elements, the formation of a corridor not directly lit in the central zone in front of the vehicle. In particular, e.g., if suitably spaced and shielded, the fog lights according to the invention can also be arranged in front of the vehicle.

According to a specific embodiment of this invention, the fog lights are integrated within the shape of the motor vehicle, and they preferably are included within the body side of the same, at a position close to the front mudguard. In that case, the beams projected by each one of the two projectors are limited towards the direction of the longitudinal axis of the motor vehicle by the shielding effect of the motor vehicle body itself.

Alternatively, according to the invention, the fog lights are outside the shape of the motor vehicle and, in order to obtain the absence of direct lighting in the central corridor in front of the vehicle, each light source is provided with a shielding element.

In particular, such shielding element can consist in an opaque tubular, rectangular or other shaped shield placed around each one of said fog lights, such shield being of higher axial length in the portion facing the longitudinal axis of the vehicle, whereas the portion of shorter axial length is placed towards the outside with respect to said axis. According to the simplest embodiment of this kind, said shield has the shape of an obliquely cut hollow cylinder.

It is to be remarked that, if the rules of the road do not set a limit to the height from the ground allowed for the fog lights (said height being, in Italy, between 0.25 and 1.10 m) fog lights can also be advantageously provided, according to the invention, on top of a motor vehicle.

In this case, in order to cooperate in creating the above-mentioned lit corridor around a central zone which is not directly illuminated, the beams projected by each of the top mounted fog lights should form, on a plane orthogonal to the ground, parallel to the longitudinal axis of the vehicle and passing through the relevant light source, an angle comprised between 0 and 90 degrees, facing upwards with respect to the vehicle. As a matter of fact, there should be obtained a lit zone above the vehicle, which zone is oriented, obviously, in the direction of the route, and has as its lower limit, preferably, a horizontal plane passing through the light source positioned on the forward end of the roof of the vehicle. The fog present in said lit zone will reflect and diffuse the light downwardly, thus indirectly illuminating the path forward of the vehicle. In achieving this goal of indirectly illuminating a corridor in front of the vehicle by directly lighting an area above a horizontal plane extending through the light source, it is preferable to use a light source comprised of two fog lights spaced apart on the front end portion of the roof of the vehicle. The light source can be spaced back from the forwardmost edge of the roof a distance which takes advantage of the roof surface assisting in preventing the light beams from directly illuminating the path in front of the vehicle. The front path being considered, for the purposes of this embodiment, the corridor in front of the vehicle defined by the road surface, the perpendicular planes extending flush with the sides of the vehicle and the horizontal plane extending flush with the essentially planar surface of the roof.

The light source can also take the form of a single fog light positioned just rearward of the forwardmost edge of the roof (e.g., the region where the roof generally intersects with the upper frame structure supporting the molding for the vehicles windshield). This single fog light can be made relatively wider than the above described fog lights used in pairs to help in indirectly illuminating essentially the entire front corridor in front of the vehicle.

The lights of this embodiment mounted on the roof of a vehicle (or other top structured component of the vehicle) preferably are designed so as to have a slanting opaque upper surface and two opaque side surfaces. The upwardly slanting upper surface of the fog light preferably slopes at an angle between 0 and 90 degrees such that the light beams emanating from the fog lights range upwardly off of a horizontal plane bisecting the fog lights (or lying essentially flush with the roof of the vehicle) from 0 to 90 degrees. Alternatively, the slanting upper surface of the fog light can slope to maintain the light beams less upwardly directed (e.g., 45 degrees or 60 degrees).

In a preferred embodiment, the fog lights are rotatable in the roof of the vehicle so as to place the upper surface of the fog light flush with the remainder of the roof when in a non-use position and so as to allow for the fog light(s) to be in a pop-up position when in use. Suitable sealing means can be used to prevent leakage below the roof. Each fog light can be raised or lowered using an internal switch and motive means such as an arrangement presently used for retractable, regular lights at the front of some vehicle models.

Alternatively, the fog lights can be mounted rigidly and in a non-moving manner to the roof or other upper component of the vehicle with a design which features an extended lower surface connected with an underlying support (e.g., the roof) and an upper planar surface which is shorter in length than the underlying lower surface so as to achieve the goal of directing the light beams only along and upwardly off of a horizontal plane lying flush with the roof of the vehicle or bisecting the fog lights. The cross-sectional configuration of the shield for the fog lights can be either round as in the embodiments described previously or in some other shape such as rectangular or elliptical.

Each of the fog lights for the roof embodiment direct beams forward along the horizontal plane and forward and upward to a maximum upward angle (e.g., between 0 and 90 degrees) with respect to the horizontal plane. The back, upper surface and side surfaces of each fog light are opaque so as to prevent beam travel along the sides or back of the fog light.

Also, in the embodiment of the invention where a fog light of the "pop-up" type is used, it is preferable to use a single centrally mounted fog light as opposed to two laterally spaced fog lights since a portion of the housing for the fog lights extends below the plane of the roof when in a retracted state. The central positioning of the fog light improves the visibility by avoiding the possibility of a portion of the housing being in the direct view of the driver.

As this invention can be carried out also by suitably modifying the motor vehicles already in use, i.e., by employing separately made fog lights of the kind described above, the invention also concerns a fog light to be assembled on a motor vehicle outside the shape thereof, such fog light being characterized in that it is surrounded by an opaque tubular or rectangular shield of higher axial length at a point, and of lesser axial length at another point which is diametrically or directly positioned opposite to the first one.

As pointed out before, the tubular shield can merely have the shape of an obliquely cut hollow cylinder.

BRIEF DESCRIPTION OF THE PREFERRED EMBODIMENT

The invention will be disclosed below by way of non limitative example, which represent some specific embodiments thereof. Said embodiments are illustrated in the enclosed drawings, wherein.

DETAILED DESCRIPTION OF THE PREFERRED EMBODIMENTS

Figure 1:
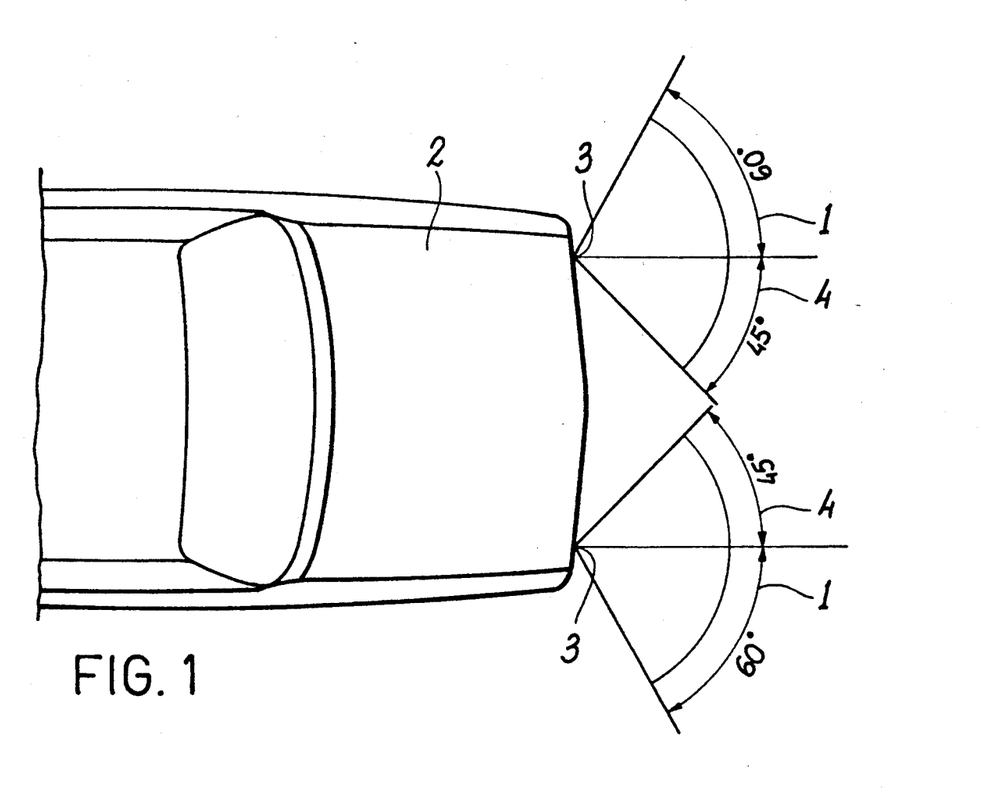
FIG. 1 shows the maximum geometrical visibility angles and the orientation of the fog lights according to the Italian rules of the road.

As shown in FIG. 1, the Italian rules of the road set out that the beams projected by the fog lights cover a maximum angle 1 of 0 to 60 degrees towards the outside, starting from the axis parallel to the axis of the motor vehicle 2 which passes through the respective light source 3. The corresponding angle 4 towards the inner side is of 45 degrees.

Figure 2:
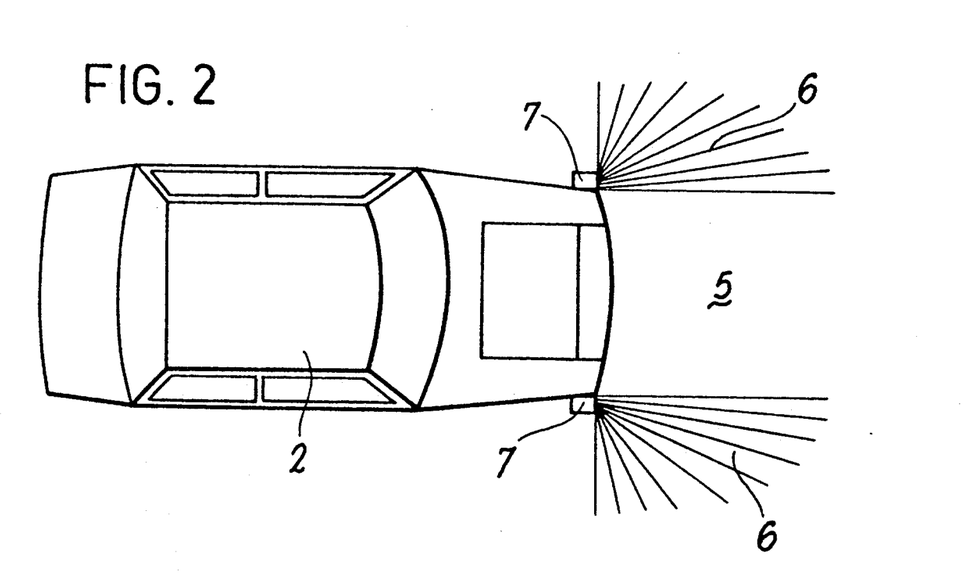
FIG. 2 shows a schematic view of the beams projected by the fog lights of a motor vehicle according to one embodiment of the invention.

According to the present invention, there is provided a fog light system wherein the two angles 4 of 45 degrees towards the central axis of the motor vehicle are completely excluded, so as to obtain a zone 5 not directly lit in front of the motor vehicle. FIG. 2 shows schematically the orientation of the beams 6 of the fog lights 7 according to the invention.

Figure 3:
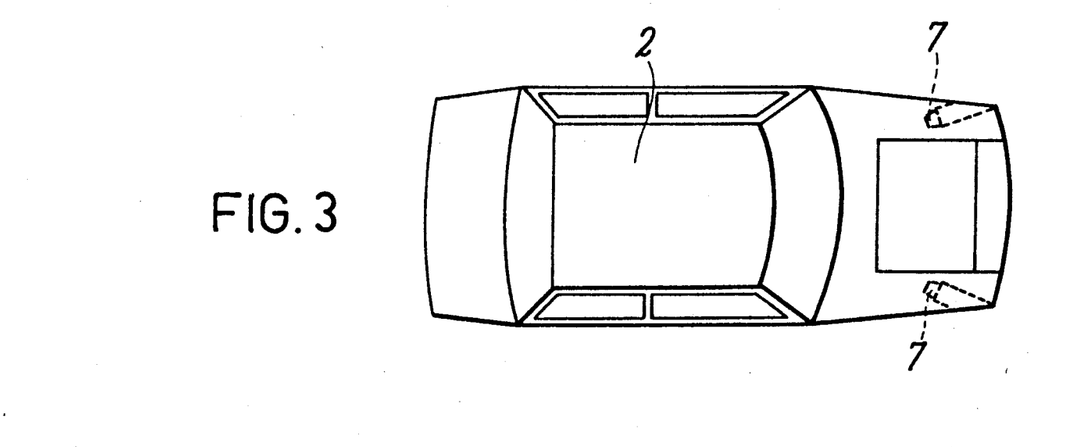
FIG. 3 shows schematically the position of fog lights according to the invention in the case in which they are integrated in the shape of a motor vehicle.

In order to obtain such distribution, the embodiment shown in FIG. 3 exploits the shielding effect provided by the body itself of the motor vehicle 2. As the fog lights 7 are embedded in the shape of the vehicle in a lateral position, the beams projected are limited by the edge of the motor vehicle body, and the zone immediately in front of the motor vehicle 2 is not lit. Preferably, the projected beam is shielded on the inside sufficiently so as to form angles extending outwardly from an axis extending parallel with the vehicle's longitudinal axis of between 0 to 90 degrees or, more preferably, between 0 to 60 degrees or between 0 to 45 degrees.

The two light cones projected by the fog lights have in that case a central axis forming an acute angle with the longitudinal axis of the motor vehicle 2, so that the maximum light intensity is directed forward in an oblique direction with respect to the route of the motor vehicle 2.

It is to be remarked that such arrangement, contrarily to what might be expected, does not result in dazzling problems to the driver of a motor vehicle proceeding from the opposite direction, because the beam strikes the driver of the opposite motor vehicle only when this is very close and for a very short time, just as a consequence of the fact that such beam is not directed straight forward.

In any case, when a driver is at such a distance from the oncoming motor vehicle that he may see the lights of such vehicle, he can employ the usual passing beams thereby switching off for a moment the fog lights according to the invention, as is usually done on extra urban roads, when employing high beams.

It is also to be remarked that the power of the fog lights according to this invention is not higher than that set forth in the rules of the road. Said power is preferably equal to the maximum one allowed by the rules of the road in force in the various countries. For example, for each of the fog lights described in the present invention, a suitable power is 55 watts to 100 watts with the upper limit depending on the rules of the road in force.

On the basis of the tests carried out, it has been found that the fog lights with indirect lighting according to this invention are increasingly efficient in enhancing visibility upon increasing fog thickness and on reducing the outer lighting.

Figure 4:
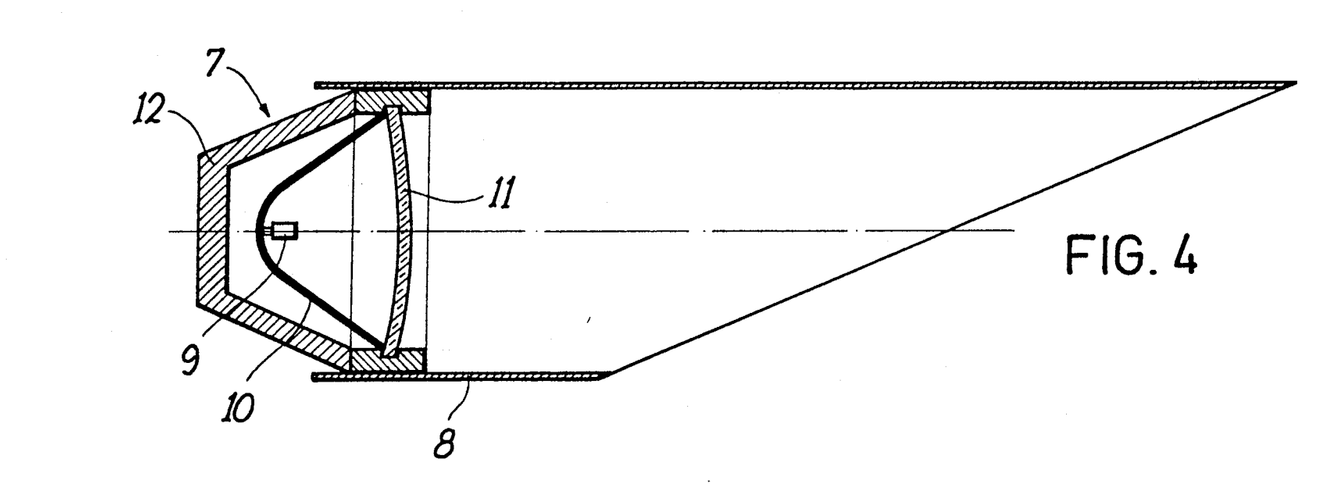
FIG. 4 shows the longitudinal cross-section of an embodiment of a fog light according to the invention, which is intended for being assembled off shape on the motor vehicle.

FIG. 4 shows schematically a cross-sectional view of an embodiment of the fog lights according to the invention, designed for being assembled on motor vehicles already in use, wherein the fog light 7 is assembled off profile. In that case, in order to obtain the zone not directly lit (which zone is shown by the number 5 in FIG. 2) the fog light 7 is provided with a shield 8. In the drawings, the shield 8 is shaped as an obliquely cut hollow cylinder. FIG. 2 also shows the lamp 9, the parabolic reflector 10, the glass 11 and the casing 12 of the fog light 7, which elements may be of the conventional type.

Figure 5:
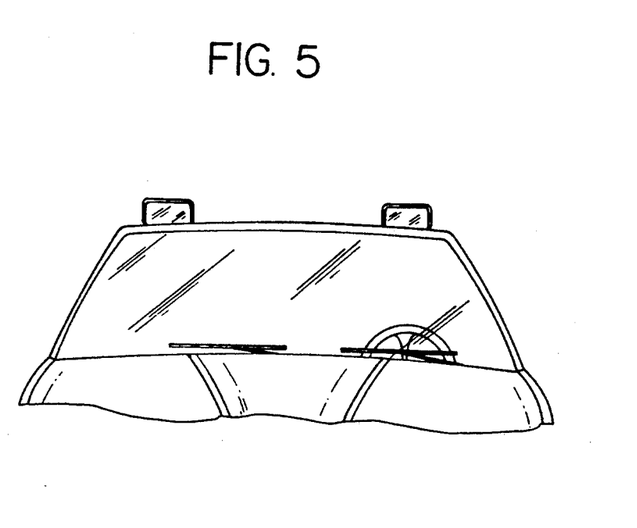
FIG. 5 shows an alternate embodiment of the invention with the fog lights supported off shape on top of the vehicle.
Figure 6:
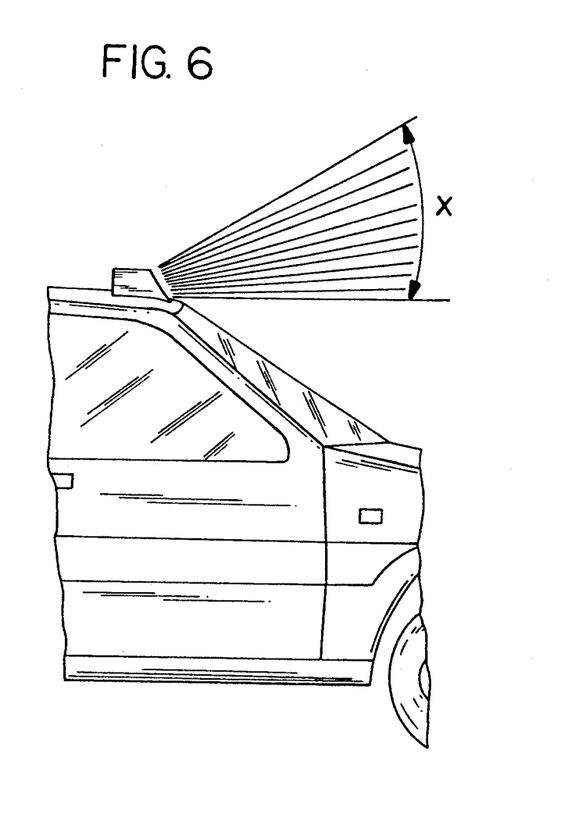
FIG. 6 shows a side view of that which is shown in FIG. 5 with the fog lights projecting beams forming an angle X.

FIGS. 5 and 6 show an alternate embodiment of the present invention wherein fog light assemblies comprising fog lights 17 are located on top of the vehicle 12 and are assembled off shape on the roof. That is, the fog lights include an upper planar surface, and a lower surface rigidly fixed to the vehicle's roof. The upper surface extends from a common starting back point with respect to the lower surface and parallel to the lower surface but terminates prior to the front end of the lower surface so as to allow light beams to extend upwardly off the essentially horizontal plane of the roof to a predetermined maximum angle (e.g., 45, 60 or 90 degrees). The fog lights are formed with an opaque back plate, upper surface and pair of side surfaces so as to maintain light beam travel directed only forward and within a predetermined range upward off of the vehicle roof. The lower surface can be an essentially planar plate extending between the lower edges of the fog lights' side surfaces and rigidly mounted to the roof. Alternatively, the roof alone can be used as the "lower surface." For example, a mounting flange (not shown) can be provided at the lower end of the fog light's opaque side surfaces and the roof surface confined by the lower edge of the back and side surfaces would constitute the lower surface. The "lower surface" assists in preventing light beams from dropping below a horizontal plane lying essentially flush with the roof and directly lighting the central corridor in front of the vehicle. The forward edge of the two side surfaces can either slope downwardly from the front edge of the upper surface to the front edge of the lower surface or curve downwardly in concave fashion.

The fog lights are dimensioned so as to project the beam of light at an angle X. Angle X extends upwardly off form a first axis which extends parallel with the longitudinal axis of the vehicle 12 and through a respective one of the fog lights 17. Angle X also lies within a plane that extends transversely off of the ground below the vehicle 12 and has the first axis lying flush thereon. Preferably, angle X is from between 0 to 90 degrees and more preferably between 0 to 45 degrees or 0 to 60 degrees. A projection of beams to 45 degrees is suited for many applications.

By directing the projected beams of light only upwardly from the level of the fog lights 17 there is avoided the shining of light in the area immediately in front of the vehicle 12 and, at the same time, a reflecting wall is created by the lit fog light above the vehicle 12, indirectly illuminating the corridor immediately in front of the vehicle. The fog lights positioned on the roof of the vehicle are also designed for a lateral spread along the horizontal plane lying flush with the vehicle roof. The light beams form on the horizontal plane angles comprised in a preferred minimum range of 0° to 45° outward on both sides of a longitudinal axis extending through the center of the fog light. The maximum range is 0° to 90° on both sides of the longitudinal axis. In other words, the lit area by the fog light or fog lights, on a horizontal plane passing through the light source would cover an overall angle of 180° when there is a 90° spread to opposite sides of the longitudinal axis extending through the fog light. The foregoing applies both for the single roof mounted fog light embodiment and to the embodiment with the pair of roof mounted fog lights described below.

Figure 7:
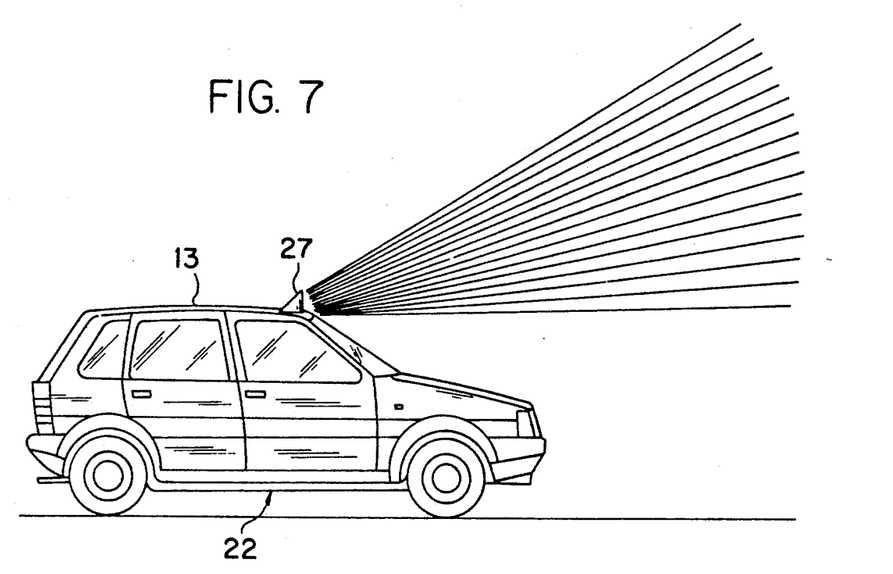
FIG. 7 shows a side view of a second alternate embodiment of the invention with the fog lights rotatably assembled on top of the vehicle, so as to be integrated in the shape of the motor in their closed position.
Figure 8:
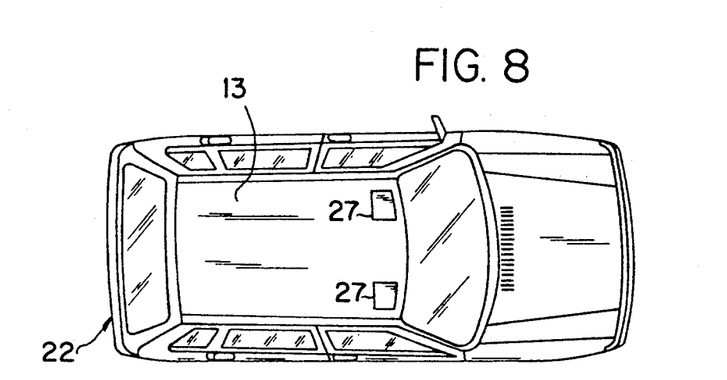
FIG. 8 shows a top plan view of the embodiment of FIG. 7 with the fog lights in their closed position.
Figure 9:
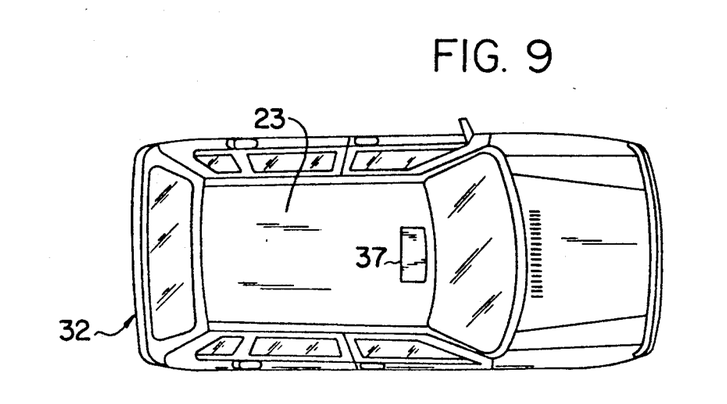
FIG. 9 shows a top plan view of a third alternate embodiment of the invention, with only one fog light rotatably assembled on top of the vehicle, shown in its closed position.

FIGS. 7–9 illustrate two different fog light assemblies with the first fog light assembly including a pair of laterally spaced fog lights and the second fog light assembly including a single fog light centrally spaced between the vehicle's side edges. The fog lights 27,37 provided on top of the vehicle 22,32 can advantageously be designed in such a way as to be integrated in a roof portion of the vehicle 22,32 when not in use. Thus, the fog lights 27,37 are rotatably assembled within the roof 13,23 and may be driven into the open position shown in FIG. 7 by operating a suitable control (not shown) located in the vehicle 22,32. The position of the fog lights 27,37 within forwardmost portion of the roof) is preferably between about 10 to 100 cms. The fog lights are rotatable into a closed position wherein their upper surface is flush with the remaining portion of the roof.

Figure 10A:
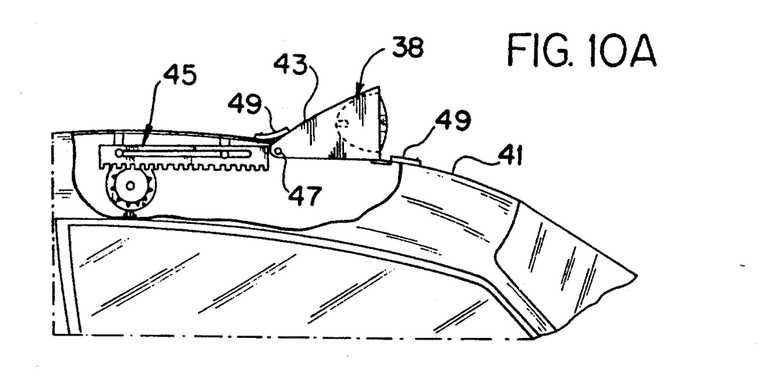
FIGS. 10A and 10B present cut away, elevational views of a fog light in a pop-up position and in a retracted position, respectively.
Figure 10B:
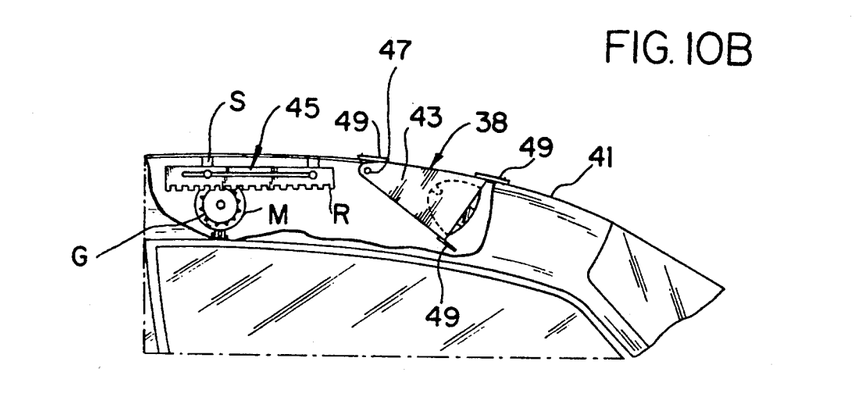
Figure 11:
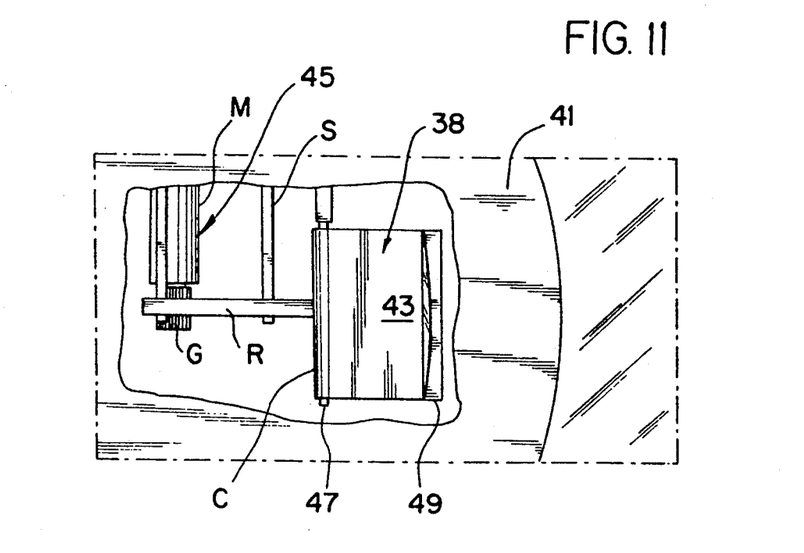
FIG. 11 shows a cut away, planar view of that which is shown in FIG. 10A.

FIGS. 10A and 10B illustrate, schematically, fog light 38 in the popped-up position and in a retracted position, respectively. FIGS. 10A and 10B also illustrate housing 43 integrated with roof 41 and motive means 45 for rotating fog light 38 about pivot axis 47 into the popped-up or in use position and the retracted or non-use position. Resilient seals 49 are provided to seal off the housing.

In the popped-up position, the upper surface 39 of the fog light preferably forms an angle with a horizontal plane bi-secting the fog-lights or a plane lying flush on the roof 41 of either 45, 60 or 90 degrees so as to retain the light directed from the fog lights within a respective one of those angles.

In the embodiment shown in FIG. 9, the single fog light 37 is made relatively longer in a lateral direction to provide for the above described lateral coverage and the wattage of the bulb is made greater than that of the bulbs used in the pair of fog lights (e.g., 100 watt versus 55 watts each). As described above the light emanating from the fog light 27 and 37 can be dispersed laterally as well as forwardly and upwardly. For example, the light emanating In the embodiment shown in FIG. 9, the single fog light 37 is made relatively longer in a lateral direction to provide for the above described lateral coverage and the wattage of the bulb is made greater than that of the bulbs used in the pair of fog lights (e.g., 100 watt versus 55 watts each). As described above the light emanating from the fog light 27 and 37 can be dispersed laterally as well as forwardly and upwardly. For example, the light emanating from the fog lights can be reflected so as to extend laterally outward 45, 60 or 90 degrees to both sides of a central axis of the fog light lying on the aforementioned horizontal plane as well as upward off the horizontal plane for 45, 60 or 90 degrees.

The embodiment shown in FIG. 9, with only one fog light 37 located centrally, is particularly advantageous when a retractable fog light is being used since the housing 43 is placed in an area which is less of a hindrance to the driver and passenger of the vehicle.

As illustrated in FIGS. 6–9, 10A, 10B and 11, each fog light mounted on the roof has a forwardmost edge longitudinally spaced from a forwardmost edge of the vehicle's roof. A distance of from 10 to 100 cms between the forwardmost edge of each fog light and the forwardmost edge of the roof is preferred in the present invention.

This invention has been disclosed with specific reference to some preferred embodiments thereof, but it is to be understood that modifications and/or changes could be brought in by those who are skilled in the art without departing from the true spirit and scope thereof. For example, both fog lights like that described above for attachment on or within the body sides of a vehicle and those positioned on top of the vehicle can be used in combination.

What is claimed is:

1. A fog light system for mounting on a roof of a vehicle, comprising:
    a first fog light;
    mounting means for mounting said first fog light to the roof of the vehicle, and said first fog light being dimensioned and arranged such that, when mounted on the roof of the vehicle, light beams emanating from the first fog light are directed along a horizontal plane extending through the fog light and upwardly off of the horizontal plane for an angle from about 0 to 90 degrees in a manner which avoids directly illuminating a central corridor positioned in front of the vehicle and below said horizontal plane.

2. A fog light system as recited in claim 1 wherein said first fog light is dimensioned and arranged so that, when mounted on the roof of the vehicle, light beams emanating from the first fog light extend upwardly off from the horizontal plane for a maximum angle of essentially 60 degrees.

3. A fog light system as recited in claim 1 wherein said first fog light is dimensioned and arranged so that, when mounted on the roof of the vehicle, light beams emanating from the fog light extend upwardly off from the horizontal plane for a maximum angle of essentially 45 degrees.

4. A fog light system as recited in claim 1 wherein said first fog light, when mounted on the roof of the vehicle, is centrally positioned between two side edges of the roof of the vehicle and represents a sole source of light for the fog light system.

5. A fog light system as recited in claim 4 wherein said first fog light, when mounted on the roof of the vehicle, has a forwardmost edge longitudinally spaced about 10 to 100 cms from a forwardmost edge of the roof of the vehicle.

6. A fog light system as recited in claim 4 wherein said first fog light is rotatable between a first position wherein an upper surface of said first fog light is essentially flush with the roof to a second position wherein the upper surface slopes upwardly away from the roof.

7. A fog light system as recited in claim 1 wherein said mounting means includes a pivot support about which said fog light is adapted to rotate between a first position wherein an upper surface of the first fog light is essentially flush with a surrounding portion of the roof of the vehicle to a second position wherein said upper surface of said first fog light slopes upwardly with respect to the surrounding portion of the roof of the vehicle.

8. A fog light system as recited in claim 1 wherein said first fog light includes an upper, opaque surface which slopes upwardly from the roof of the vehicle for an angle which is essentially equal to a maximum angle said light beams extend upwardly off from said horizontal plane.

9. A fog light system as recited in claim 1 wherein said first fog light includes a back surface, an upper surface and two side surfaces with the upper surface extending longitudinally parallel with the roof surface for a distance less than a lower edge of said side surfaces such that light beams are directed directly forward and upward at an angle extending between said horizontal plane and a line extending from the horizontal plane and lying flush on a forwardmost edge of the upper surface.

10. A fog light system as recited in claim 1 wherein said first fog light, when mounted on the roof of the vehicle, has a forwardmost edge longitudinally spaced about 10 to 100 cms. from a forwardmost edge of the roof of the vehicle.

11. A fog light system as recited in claim 1 further comprising a second fog light laterally spaced from said first fog light at a forward portion of the roof of the vehicle and shaped and dimensioned like said first fog light.

12. A fog light assembly as recited in claims 11 wherein said first and second fog lights each laterally disperse light beams forward and outward for an angle falling within the range of 0° to 180°.

13. A fog light system as recited in claim 1 wherein said fog light is mounted on the roof centrally of lateral edges of said roof and constitutes a sole fog light in said fog light system, and said sole fog light laterally disperses light beams both forward and outward for an angle falling within a range of 0° to 90° to opposite sides of a longitudinal axis extending through the said fog light.

14. A method for enhancing visibility when driving a vehicle in fog, comprising:
   directing light beams from a fog light mounted on the roof of the vehicle which extend along a horizontal plane extending through said fog light and upwardly off of the horizontal plane for an angle from 0 to 90 degrees so as to avoid directly lighting a central corridor positioned in front of the vehicle and below said horizontal plane with said fog light while providing indirect illumination of the central corridor through reflection of light impinging upon fog positioned along and above said horizontal plane.

15. A method as recited in claim 14 wherein directing light beams includes directing light beams from a single fog light source positioned essentially equally distanced from opposite side edges of the roof of the vehicle.

16. A front section of a motor vehicle, comprising: at least one fog light, said at least one fog light being positioned on a forward roof portion of the motor vehicle such that beams projected by said fog light forms, on a plane that is orthogonal to a ground surface below the vehicle and extending parallel to a longitudinal axis of the motor vehicle, angles comprised between 0 and 90 degrees which open upward off from the roof portion.

17. A front section as recited in claim 16, wherein said angles are comprised between 0 and 60 degrees.

18. A front section as recited in claim 16, wherein said angles are comprised between 0 and 45 degrees.

19. A front section as recited in claim 16, wherein a single fog light is positioned on said roof essentially equally spaced from side edges of the roof.

20. A front section as recited in claim 16, wherein a pair of fog lights are laterally spaced on the roof and set back from a forwardmost edge the roof for a longitudinal distance of about 10 to 100 cms.

21. A front section of a motor vehicle as recited in claim 19 further comprising pivotable mounting means for mounting said at least one fog light to the roof such that said fog light is positionable between a first position wherein an upper surface of said fog light is essentially flush with a surrounding roof portion to a second position wherein the upper surface slopes upwardly from the roof surface.

22. A front section of a motor vehicle as recited in claim 21 wherein said fog light is dimensioned and arranged so as to disperse light laterally to opposite sides of a central axis of said fog light and flush with the horizontal plane for an angle range of 0° to 90° to opposite sides of the central axis of the fog light.

23. A front section of a motor vehicle as recited in claim 16 wherein said fog light includes an upper surface and two side surfaces, and the upper surface extends in a forward to rearward direction parallel to the roof surface and for a distance less than that of lower edges of said side surfaces such that light beams are prevented from dropping below a horizontal plane lying essentially flush with the vehicle roof and allowed to extend upwardly for an angle from 45 to 60 degrees.

* * * * *